(12) United States Patent
Song et al.

(10) Patent No.: US 9,313,414 B2
(45) Date of Patent: Apr. 12, 2016

(54) REGION BASED SHUTTER ADAPTATION METHOD FOR IMAGE EXPOSURE

(71) Applicants: Willie Song, Penang (MY); Wui-Pin Lee, Penang (MY)

(72) Inventors: Willie Song, Penang (MY); Wui-Pin Lee, Penang (MY)

(73) Assignee: PIXART IMAGING (PENANG) SDN. BHD., Penang (MY)

( * ) Notice: Subject to any disclaimer, the term of this patent is extended or adjusted under 35 U.S.C. 154(b) by 0 days.

(21) Appl. No.: 14/450,216

(22) Filed: Aug. 2, 2014

(65) Prior Publication Data

US 2015/0350508 A1    Dec. 3, 2015

(30) Foreign Application Priority Data

May 30, 2014  (MY) ................................ 2014001583

(51) Int. Cl.
*H04N 5/235*  (2006.01)
*H04N 5/243*  (2006.01)

(52) U.S. Cl.
CPC .......... *H04N 5/2352* (2013.01); *H04N 5/2353* (2013.01); *H04N 5/243* (2013.01)

(58) Field of Classification Search
CPC .... H04N 5/2352; H04N 5/2353; H04N 5/243
USPC .......................................................... 348/362
See application file for complete search history.

(56) References Cited

U.S. PATENT DOCUMENTS

| | | | |
|---|---|---|---|
| 2002/0008771 A1* | 1/2002 | Uchino et al. | 348/362 |
| 2002/0021901 A1* | 2/2002 | Shimizu | 396/429 |
| 2011/0043674 A1* | 2/2011 | Takane | 348/296 |
| 2011/0141331 A1* | 6/2011 | Lee et al. | 348/297 |

* cited by examiner

*Primary Examiner* — Gevell Selby
(74) *Attorney, Agent, or Firm* — Tung & Associates

(57) ABSTRACT

The present invention discloses a region based shutter adaptation method for image exposure. The method includes the steps of: (a) providing an image which is non-uniformly illuminated; (b) segmenting the image into two or more non-overlapping regions; (c) identifying brightness values for each of the regions when more than one brightness value has been produced for each of the regions; (d) applying the whole image with different shutters for different regions; and (e) exposing different regions for different exposure durations according to the brightness values respectively assigned to the regions, so that the present invention is capable of enabling different regions within the whole image which is non-uniformly illuminated to have different shutter adaptions.

11 Claims, 7 Drawing Sheets

Region R51 includes all the pixels denoted by the number 1

Region R52 includes all the pixels denoted by the number 2

Region R53 includes all the pixels denoted by the number 3

Region R54 includes all the pixels denoted by the number 4

REGION BASED SHUTTER ADAPTATION METHOD FOR IMAGE EXPOSURE

CROSS REFERENCE

The present invention claims priority to Malaysia patent application PI 2014001583 filed on May 30, 2014.

BACKGROUND OF THE INVENTION

1. Field of Invention

The present invention relates to a region based shutter adaptation method for image exposure; particularly, it relates to such a method capable of exposing different regions within an image which is non-uniformly illuminated by different exposure parameters to better extract information in such a non-uniformly illuminated image.

2. Description of Related Art

Referring to FIG. 1, conventionally, a prior art shutter control method assumes that an image 10 is uniformly illuminated across the whole image, and hence the shutter exposes the image 10 by one exposure region SR1 which covers the whole image 10, and the exposure parameters such as time duration of exposure (exposure duration) are the same for every pixel in the image 10.

However, if an image does not comply with the assumption, i.e., the image is not uniformly illuminated, which is often the case when the image is taken under low natural light, the conventional method can not obtain complete and sufficient information of the image.

Referring to FIGS. 2A and 2B, which show an image 20 which is non-uniformly illuminated but is exposed by the same exposure duration (e.g., 100 ms) across the whole image. As shown in FIGS. 2A and 2B, the shutter is adapted to the brightest region R1 in the image, i.e., the exposure duration is determined by taking the brightest region R1 as the priority concern. Therefore, all other parts of the image 20 is underexposed. For example, the region R2 which is the darkest region in the image 20 is underexposed. Any information or feature that is contained in this region R2 is lost and can not be extracted.

In summary, the conventional shutter control method exposes an image by one exposure region with the same exposure parameters across the whole image. If the image is not uniformly illuminated such that the brightness conditions vary greatly in the image, the conventional shutter control method can only adapt the shutter to a small brightness range within the image, and the information or feature that is contained in the other part of the image is lost. For example, if the shutter is adapted to the brightest region, the information or feature that is contained in a darker part of the image is lost; if the shutter is adapted to the darkest region, the information or feature that is contained in a brighter part of the image is lost.

In view of the above, to overcome the drawback in the prior art, the present invention proposes a shutter adaptation method capable of exposing different regions of an image by different exposure parameters to better extract information in a non-uniformly illuminated image.

SUMMARY OF THE INVENTION

From one perspective, the present invention provides a region based shutter adaptation method for image exposure, comprising the steps of: (a) obtaining an image; (b) segmenting the image into two or more non-overlapping regions; (c) identifying a brightness value of each of the regions; and (d) applying exposure parameters to the regions according to the brightness values of the regions, respectively, wherein the exposure parameter applied to one of the regions is different from the exposure parameter applied to at least another one of the regions.

In one embodiment, the exposure parameter includes exposure durations.

In one embodiment, the step (c) includes identifying a first region having a highest brightness value and identifying a second region having a lowest brightness value, and the step (d) includes exposing the first region by a shortest exposure duration and exposing the second region by a longest exposure duration which is longer than the shortest exposure duration.

In one embodiment, the image includes a plurality of pixels and each pixel has a corresponding brightness value, and wherein the brightness value of a region is represented by a brightness value of the brightest pixel in the region; by an average brightness value of all the pixels in the region; or by a number of the pixels which have a brightness value higher than a brightness threshold.

In one embodiment, the image includes a plurality of pixels, and wherein the image is segmented into different regions by locations of the pixels, by colors of the pixels, or by locations and colors of the pixels. In one embodiment, the image includes a plurality of pixel units and each pixel unit includes pixels of different colors, and wherein at least one region consists of pixels of only one color.

In one embodiment, the image includes a plurality of pixels, and every region consists of pixels which are directly or indirectly neighboring to one another.

In one embodiment, the image includes a plurality of pixels, and at least one region includes pixels which are not directly or indirectly neighboring to one another.

The objectives, technical details, features, and effects of the present invention will be better understood with regard to the detailed description of the embodiments below, with reference to the attached drawings.

DESCRIPTION OF THE PREFERRED EMBODIMENTS

The above and other technical details, features and effects of the present invention will be will be better understood with regard to the detailed description of the embodiments below, with reference to the drawings. The drawings as referred to throughout the description of the present invention are for illustration only, but not drawn according to actual scale.

Figures 3A, 3B:
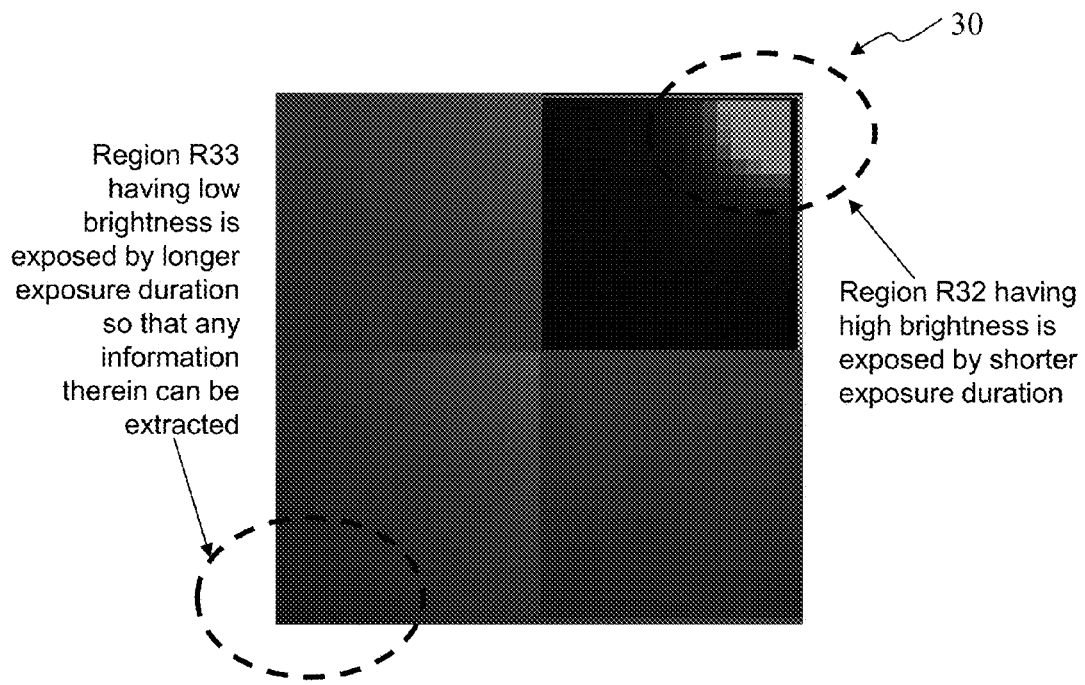
FIG. 3A shows an image which is non-uniformly illuminated but the information contained in the image can be completely extracted according to an embodiment of the present invention.
FIG. 3B shows an embodiment as to how the non-uniformly illuminated image of FIG. 3A is segmented into four non-overlapping regions, in which different regions are exposed by different exposure durations.
Figure 4:
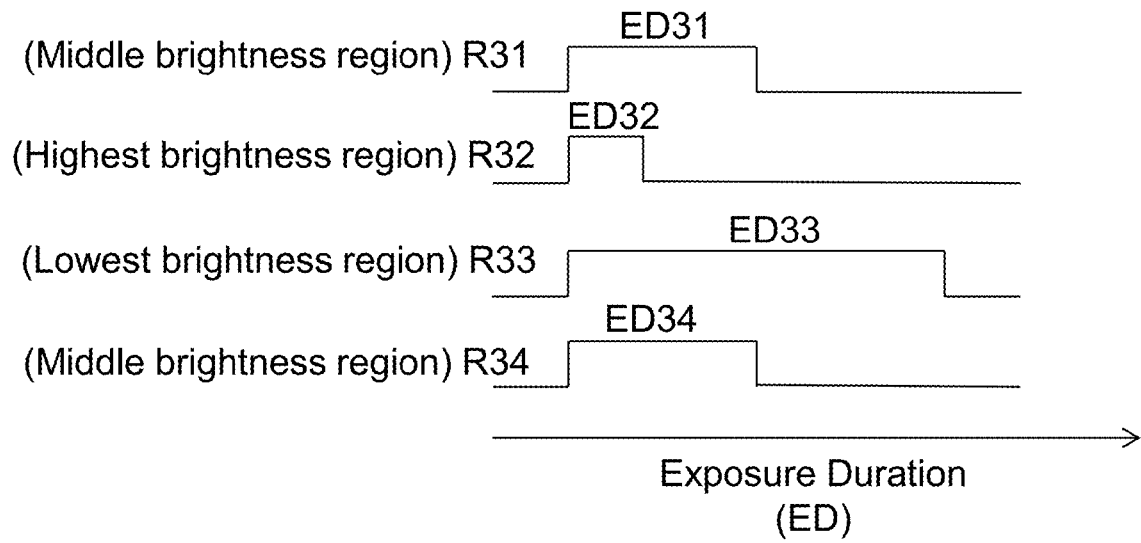
FIG. 4 shows the exposure durations for different regions of FIG. 3B.
Figure 5:
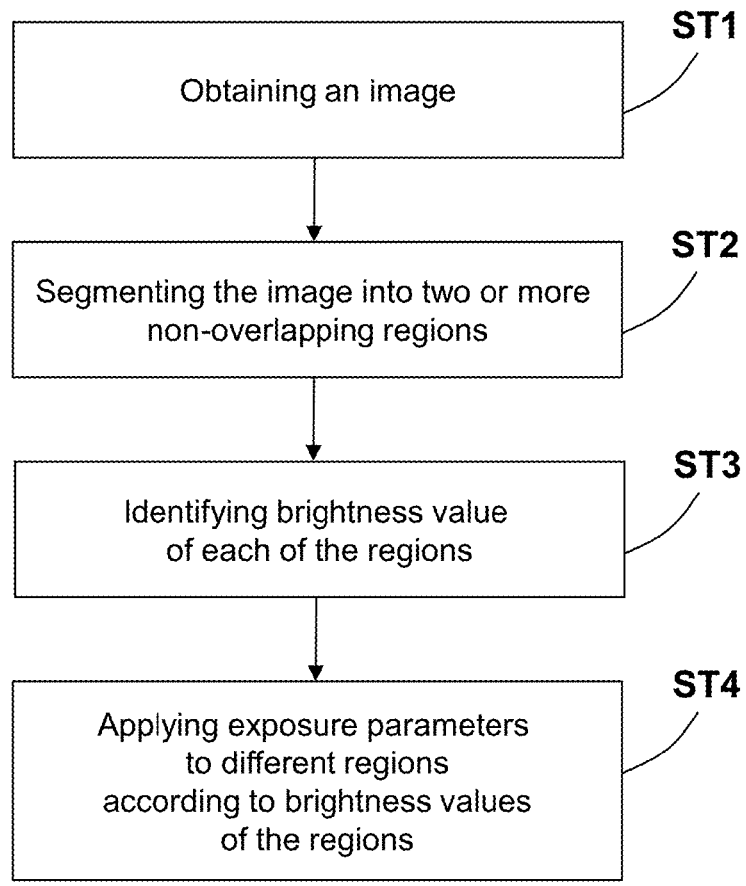
FIG. 5 shows a flowchart of a region based shutter adaptation method according to an embodiment of the present invention.
Figure 6A:
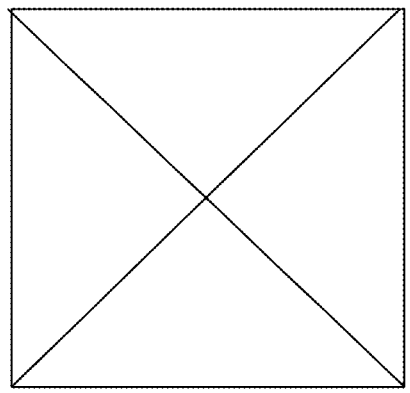
FIGS. 6A-6D show several other embodiments as to how the non-uniformly illuminated image of FIG. 3A is segmented into different non-overlapping regions.
Figure 6B:
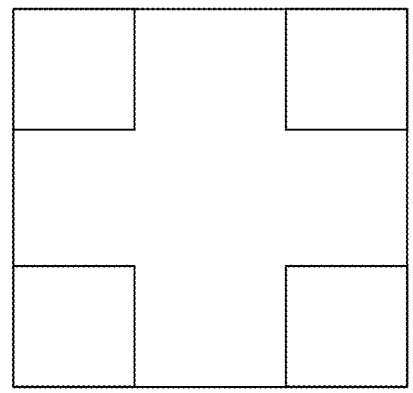
Figure 6C:
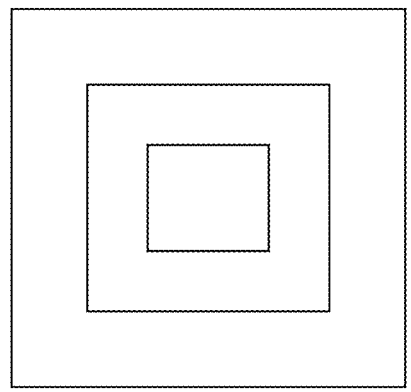
Figure 6D:
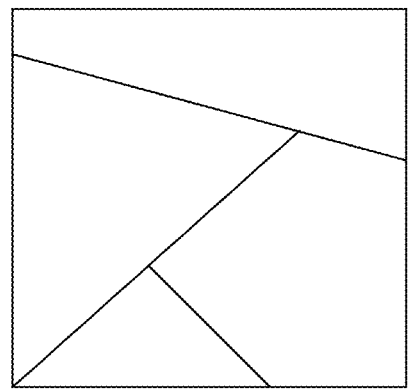

Please refer to FIGS. 3A-3B and 4-5. FIG. 3A shows an image 30 which is non-uniformly illuminated. FIG. 3B shows an embodiment as to how the non-uniformly illuminated image 30 of FIG. 3A is segmented into four non-overlapping regions R31-R34, in which different regions R31-R34 are exposed by different exposure parameters (in this embodiment, different exposure durations ED31-ED34 as shown in FIG. 4). FIG. 5 shows a flowchart of a region based shutter adaptation method according to an embodiment of the present invention.

After obtaining an image 30 (the step ST1 in FIG. 5), the image 30 is segmented into different regions R31-R34 (the step ST2 in FIG. 5). Typically, an image includes multiple pixels, so each of the regions R31-R34 include one or more pixels.

As shown in FIG. 3B, in one embodiment, the number of the regions is, for example but not limited to, four. In other embodiments, the number of the regions may be varied as a matter of design choice.

Besides, in the embodiment of FIGS. 3A-3B, all the regions R31-R34 are rectangular and all four regions R31-R34 have the same area size. This is only one non-limiting embodiment of the present invention. In other embodiments, the image can be segmented by any other ways wherein the regions can have the same or different shapes, the same or different area sizes, and located by any layout. Several non-limiting examples are given in FIGS. 6A-6D.

Next, in the step ST3 in FIG. 5, this embodiment identifies the brightness value of each of the regions R41-R44. Because the image 30 is non-uniformly illuminated, at least some of the regions R31-R34 have different brightness values. The brightness value of a region can be calculated by any suitable ways, and the present invention is not limited to anyone of them. For example, the brightness value of a region can be represented by a brightness value of the brightest pixel in the region; the brightness value of a region can be represented by an average brightness value of all the pixels in the region; the brightness value of a region can be represented by a number of the pixels which have a brightness value higher than a brightness threshold; etc. (Each pixel has a corresponding brightness value.)

In the step ST4 in FIG. 5, this embodiment applies exposure parameters to the regions R31-R34 according to brightness values of the regions R31-R34. Referring to FIGS. 3B and 4, the region R32 having the highest brightness value is exposed by a shortest exposure duration ED32, while the region R33 having the lowest brightness value is exposed by a longest exposure duration ED33. The regions R31 and R34 having middle brightness values are exposed by exposure durations with a time length between the shortest exposure duration ED32 and longest exposure duration ED33. In this embodiment, the regions R31 and R34 have similar brightness values, so the exposure durations ED31 and ED34 have the same time length. In another embodiment, the exposure durations ED31 and ED34 may have different time lengths.

The exact time lengths of the exposure durations ED31-ED34 can be determined in correspondence with the brightness values of the regions R31 and R34. In this embodiment, for example, the exposure duration ED32 is 100 ms, the exposure durations ED31 and ED34 are 150 ms each, and the exposure duration ED33 is 300 ms. Certainly, the numbers can change according to practical requirements of exposure.

Note that, although the embodiment shown by FIGS. 3A-3B and 4-5 discloses three different exposure parameters applied to four regions, the present invention is not limited to this arrangement. The present invention only requires at least two different exposure parameters applied to at least two different regions. The minimum requirement is that the exposure parameter applied to one of the regions is different from the exposure parameter applied to at least another one of the regions. A region other than these two regions can use an exposure parameter which is the same as or different from the exposure parameter of one of the two regions.

Figure 1:
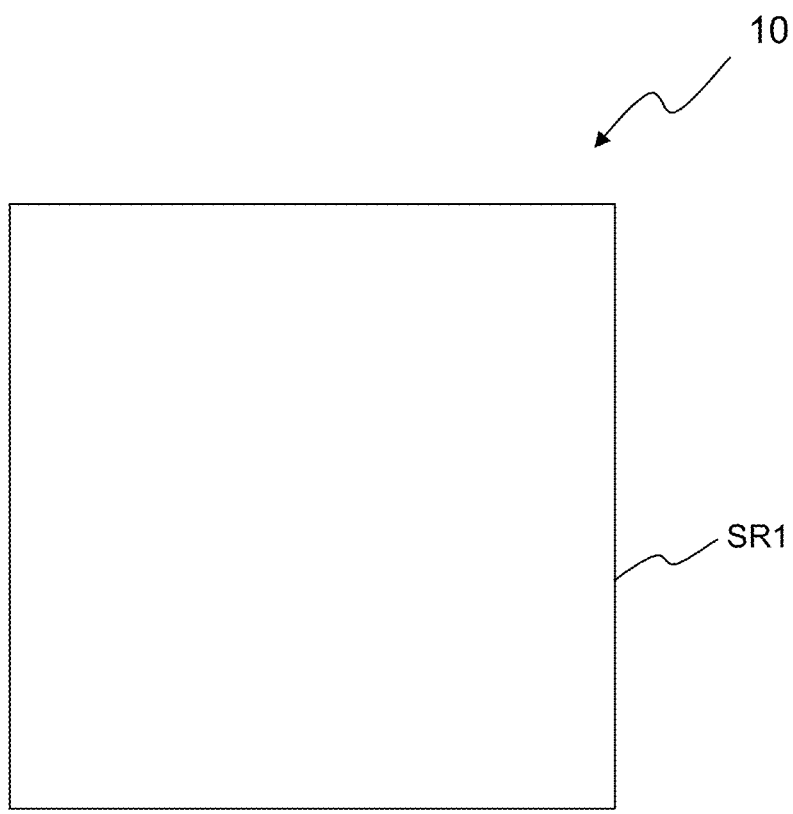
FIG. 1 shows that in a conventional shutter control method, the shutter exposes an image 10 by one exposure region SR1.
Figure 2A:
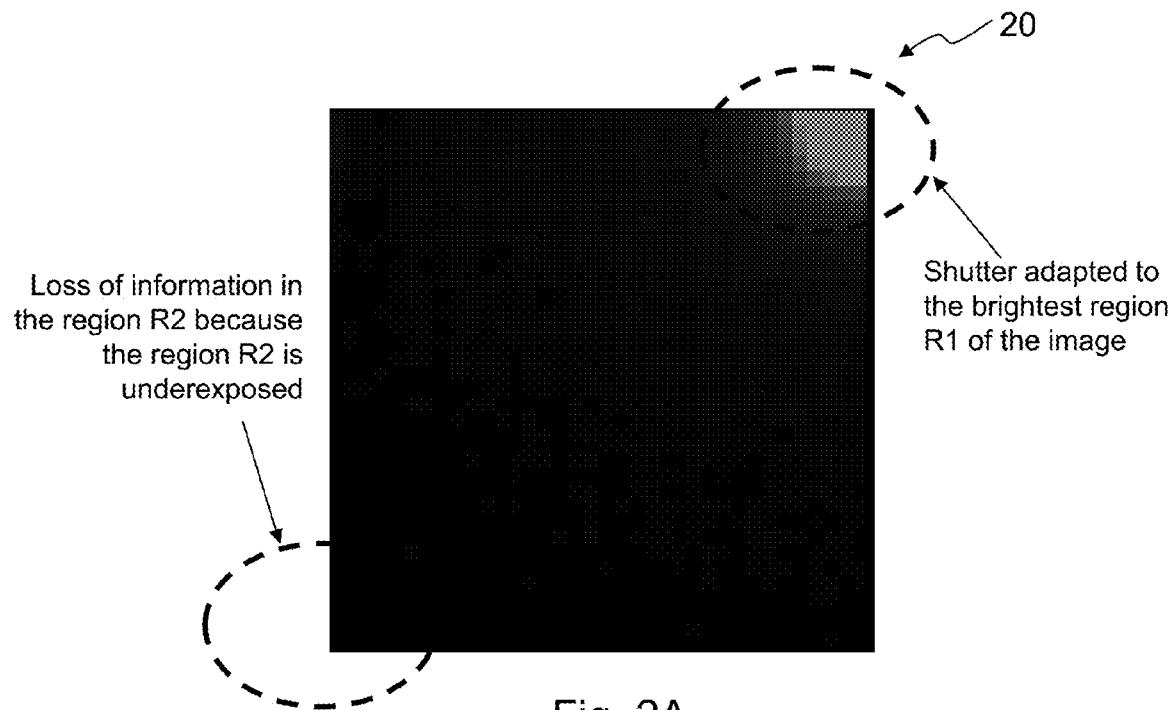
FIGS. 2A and 2B show that when an image is non-uniformly illuminated, the information contained in the image can not be completely extracted by the conventional method.
Figure 2B:
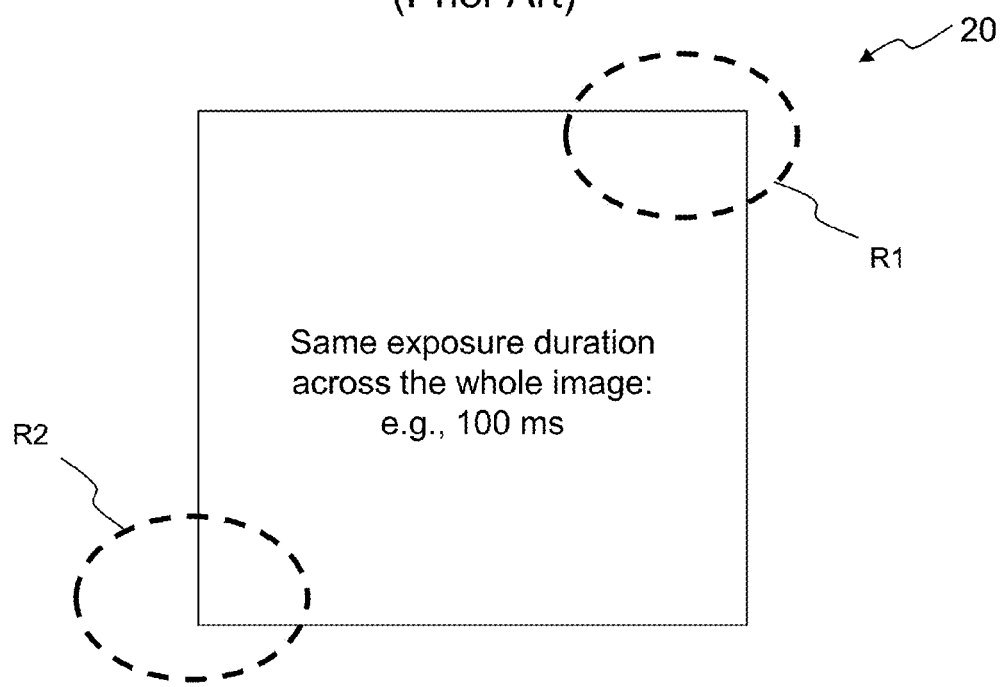

As compared to the prior art shown in FIGS. 2A-2B where only one exposure region is assigned to the whole non-uniformly illuminated image 20, the present invention can obtain better information of the non-uniformly illuminated image 30 because the exposure duration for each respective region can be different. In FIGS. 2A-2B, because only one exposure duration is applied to everywhere in the image 20, either the region R2 is underexposed or the region R1 is overexposed. However, in the present invention, the information or features in the regions R31-R34 can be respectively obtained by different exposure parameters most suitable to respective regions.

Note that a "region" in an image does not necessarily have to consist of a group of pixels which are directly or indirectly neighboring to one another. For clarity, the term "directly neighboring" is defined as two pixels directly in contact with each other; the term "indirectly neighboring" is defined as two pixels which are not directly in contact with each other but can be connected through one or more pixels in the same region. A "region" can be a group of pixels by any definition, which can include pixels which are neighboring (directly or indirectly) to one another or pixels which are not neighboring to one another.

Figure 7:
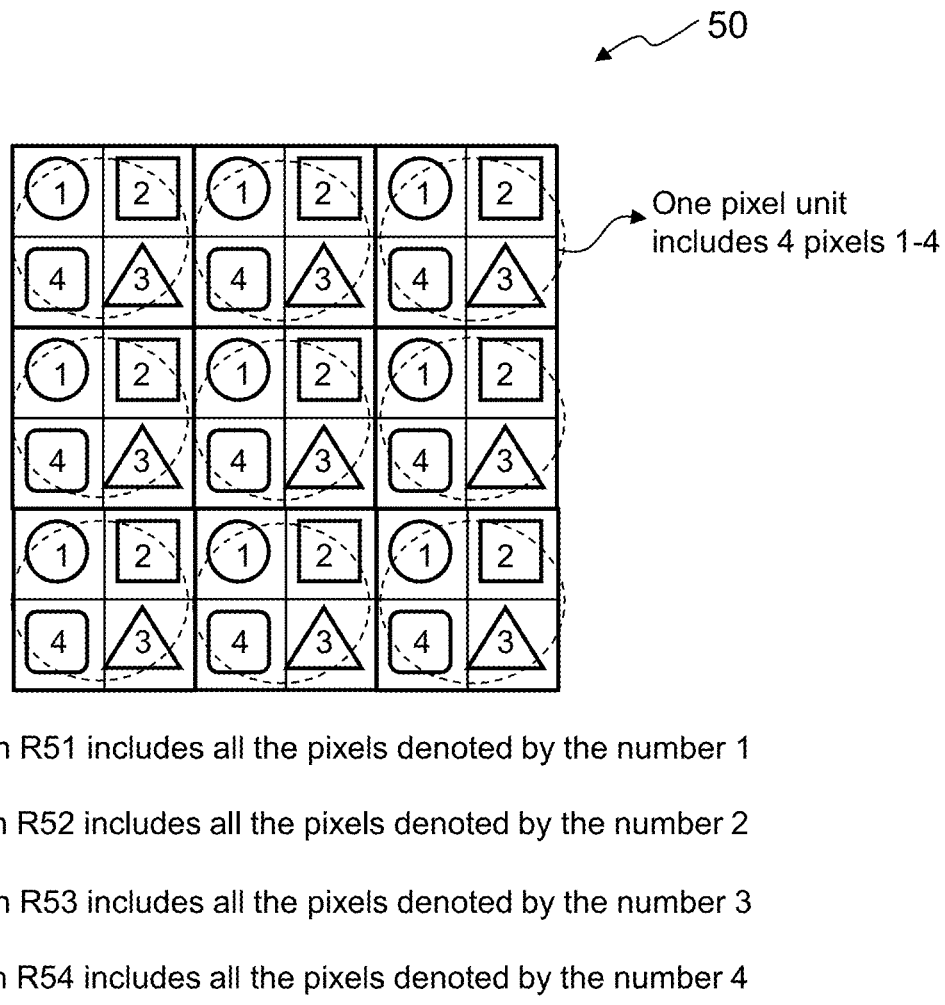
FIG. 7 shows an embodiment as to how a non-uniformly illuminated color image is segmented into four non-overlapping regions by pixels of different colors.

FIG. 7 shows an embodiment wherein a "region" includes a group of pixels which are separated from one another. As an illustrative example to explain why the regions are thus defined, it is assumed that the image 50 is a color image wherein each pixel unit includes four pixels 1-4. For example, the number 1 may indicate green pixels; the number 2 may indicate red pixels; the number 3 may indicate blue pixels; and the number 4 may indicate red pixels or a fourth color.

Please refer to FIG. 7 in conjunction with FIG. 5. After obtaining an image 50 (the step ST1 in FIG. 5), the image 50 is segmented into four different regions R51-R54 (the step ST2 in FIG. 5), wherein the region 51 includes all the pixels denoted by the number 1; the region 52 includes all the pixels denoted by the number 2; the region 53 includes all the pixels denoted by the number 3; and the region 54 includes all the pixels denoted by the number 4. (The shapes circle, square, triangle and rounded-square that encompass the numbers 1-4 are used to illustrate the grouping, not about the sizes of the pixels). In one embodiment, at least one of the regions 51-54 consists of pixels of only one color.

Even if the ambient light is uniform and the image 50 is uniformly illuminated, the brightness of each color may be different in response to such ambient light. For example, there may be stronger light intensity in the green component than the other color components. According to the present invention, for better extracting information or features in the image 50, the regions R51-R54 can be exposed by different exposure parameters such as by different exposure durations.

Figure 8A:
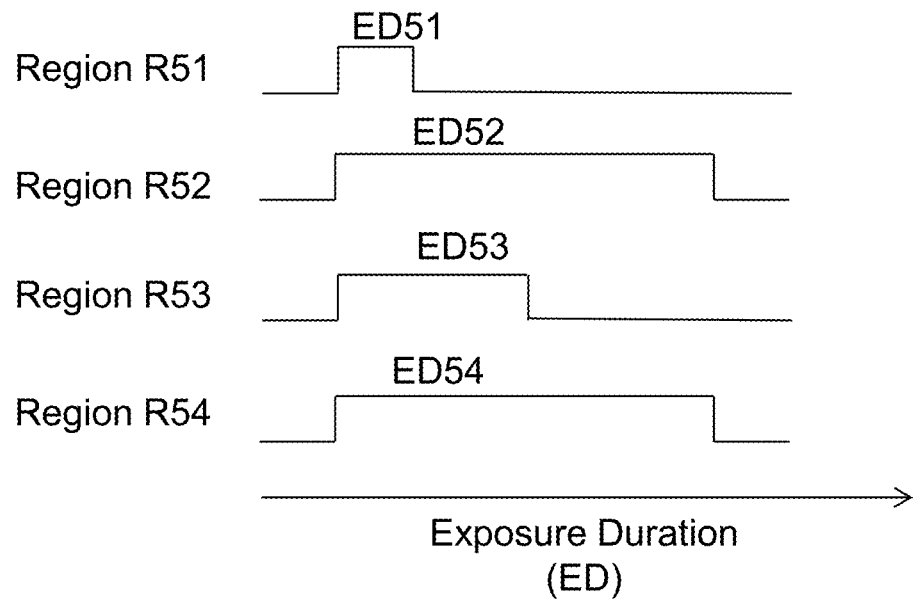
FIG. 8A shows an embodiment of the exposure durations of the regions of FIG. 7.
Figure 8B:
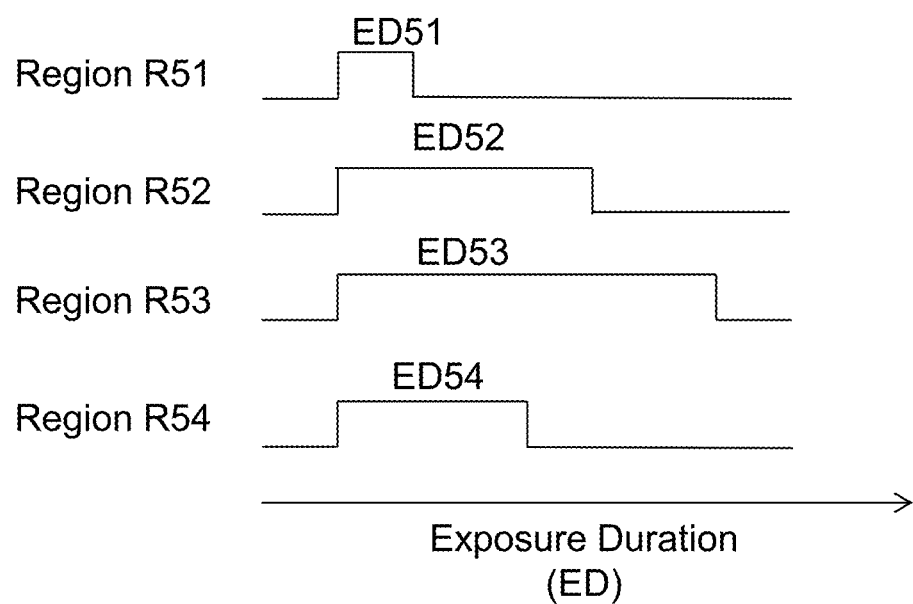
FIG. 8B shows anther embodiment of the exposure durations of the regions of FIG. 7.

FIGS. 8A-8B show two embodiments of the exposure durations of the regions R51-R54 of FIG. 7. Please refer to FIG. 8A and the steps ST3-ST4 in FIG. 5, this embodiment identifies the brightness values of the regions R51-R54 and exposes the regions R51-R54 by corresponding exposure durations ED51-54 (as shown in FIG. 8A).

More specifically, for example, the ambient light has strong green component (strong green light intensity), weak red component (weak red light intensity), and the light intensity of the blue component is in between. Therefore, as shown in FIG. 8A, the exposure duration ED51 for the region R51 which includes all the green pixels is the shortest; the exposure duration ED53 for the region R53 which includes all the blue pixels is longer than the exposure duration ED51; and the exposure durations ED52 and ED54 for the regions R52 and R54 which include the red pixels are the same and the longest.

In another embodiment, although the regions R52 and R54 are both groups of red pixels, these regions do not have to be exposed by the same exposure duration. As shown in FIG. 8B, assuming that the regions R52 and R54 are both groups of red pixels, these regions R52 and R54 are exposed by different exposure durations according to their respective brightness values. That is, pixels of the same color can be divided into different regions and exposed by different exposure parameters such as different exposure durations. In other words, an image can be segmented into different regions by any characteristics of the pixels, such as but not limited to: by locations of the pixels, by colors of the pixels, or by locations and colors of the pixels.

The present invention has been described in considerable detail with reference to certain preferred embodiments thereof. It should be understood that the description is for illustrative purpose, not for limiting the scope of the present invention; for example, the colors of the pixels are not limited to green, red and blue. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. In view of the foregoing, the spirit of the present invention should cover all such and other modifications and variations, which should be interpreted to fall within the scope of the following claims and their equivalents.

What is claimed is:

1. A region based shutter adaptation method for image exposure, comprising the steps of:
   (a) obtaining an image, wherein the image includes a plurality of pixel units and each pixel unit includes pixels of different colors, and wherein at least one region consists of pixels of only one color;
   (b) segmenting the image into two or more non-overlapping regions;
   (c) identifying a brightness value of each of the regions; and
   (d) applying exposure parameters to the regions according to the brightness values of the regions, respectively, wherein the exposure parameter applied to one of the regions is different from the exposure parameter applied to at least another one of the regions.

2. The region based shutter adaptation method for image exposure of claim 1, wherein the exposure parameter includes exposure durations.

3. The region based shutter adaptation method for image exposure of claim 2, wherein the step (c) includes identifying a first region having a highest brightness value and identifying a second region having a lowest brightness value, and the step (d) includes exposing the first region by a shortest exposure duration and exposing the second region by a longest exposure duration which is longer than the shortest exposure duration.

4. The region based shutter adaptation method for the image of claim 1, wherein the image includes a plurality of pixels and each pixel has a corresponding brightness value, and wherein the brightness value of a region is represented by a brightness value of the brightest pixel in the region; by an average brightness value of all the pixels in the region; or by a number of the pixels which have a brightness value higher than a brightness threshold.

5. The region based shutter adaptation method for the image of claim 1, wherein the image includes a plurality of pixels, and wherein the image is segmented into different regions by locations of the pixels, by colors of the pixels, or by locations and colors of the pixels.

6. The region based shutter adaptation method for the image of claim 1, wherein the image includes a plurality of pixels, and every region consists of pixels which are directly or indirectly neighboring to one another.

7. A region based shutter adaptation method for image exposure, comprising the steps of:
   (a) obtaining an image, wherein the image includes a plurality of pixels, and at least one region includes pixels which are not directly or indirectly neighboring to one another;
   (b) segmenting the image into two or more non-overlapping regions;
   (c) identifying a brightness value of each of the regions; and
   (d) applying exposure parameters to the regions according to the brightness values of the regions, respectively, wherein the exposure parameter applied to one of the regions is different from the exposure parameter applied to at least another one of the regions.

8. The region based shutter adaptation method for image exposure of claim 7, wherein the exposure parameter includes exposure durations.

9. The region based shutter adaptation method for image exposure of claim 8, wherein the step (c) includes identifying a first region having a highest brightness value and identifying a second region having a lowest brightness value, and the step (d) includes exposing the first region by a shortest exposure duration and exposing the second region by a longest exposure duration which is longer than the shortest exposure duration.

10. The region based shutter adaptation method for the image of claim 7, wherein each pixel has a corresponding brightness value, and wherein the brightness value of a region is represented by a brightness value of the brightest pixel in the region; by an average brightness value of all the pixels in the region; or by a number of the pixels which have a brightness value higher than a brightness threshold.

11. The region based shutter adaptation method for the image of claim 7, wherein the image is segmented into different regions by locations of the pixels, by colors of the pixels, or by locations and colors of the pixels.

* * * * *